United States Patent [19]
Reason et al.

[11] Patent Number: 6,027,031
[45] Date of Patent: Feb. 22, 2000

[54] METHOD AND APPARATUS FOR CHANGING OPERATIONAL MODES OF A TRANSPORT REFRIGERATION SYSTEM

[75] Inventors: John R. Reason, Liverpool; L Thomas Lane, Manlius, both of N.Y.

[73] Assignee: Carrier Corporation, Syracuse, N.Y.

[21] Appl. No.: 09/156,346

[22] Filed: Sep. 18, 1998

Related U.S. Application Data

[62] Division of application No. 08/994,380, Dec. 19, 1997, Pat. No. 5,860,594.

[51] Int. Cl.[7] ................................................... G05D 23/00
[52] U.S. Cl. ........................... 236/91 E; 62/209; 165/291
[58] Field of Search ................................. 236/91 E, 78 D; 62/160, 208, 209, 229, 203, 59; 165/291, 293, 297

[56] References Cited

U.S. PATENT DOCUMENTS

| | | | |
|---|---|---|---|
| 4,211,089 | 7/1980 | Mueller et al. | 62/209 |
| 4,250,716 | 2/1981 | Huffman | 62/180 |
| 4,460,036 | 7/1984 | Yoshimi et al. | 165/12 |
| 4,509,586 | 4/1985 | Watabe | 165/29 |
| 4,899,549 | 2/1990 | Berge et al. | 62/160 |
| 5,209,072 | 5/1993 | Truckenbrod et al. | 62/56 |
| 5,860,594 | 1/1999 | Reason et al. | 236/91 E |

Primary Examiner—Henry Bennett
Assistant Examiner—Marc Norman

[57] ABSTRACT

A method and apparatus for changing operational modes of a transport refrigeration unit, where the unit is capable of operating in a continuous heating/cooling mode or an automatic start/stop heating/cooling mode. A supply air temperature sensor measures the temperature of the air exiting the unit, a return air temperature sensor measures the temperature of the air returning to the unit, and an ambient air temperature sensor measures the temperature of the ambient air outside the unit. A controller electrically connected to the sensors determines if the ambient air temperature is above or below a pre-determined setpoint temperature, determines if the temperature differential across the return and supply air sensors is above or below a pre-determined upper threshold or a pre-determined lower threshold, and then changes the operational mode of the unit based upon such determinations and the prior operational mode of the unit.

5 Claims, 5 Drawing Sheets

METHOD AND APPARATUS FOR CHANGING OPERATIONAL MODES OF A TRANSPORT REFRIGERATION SYSTEM

This is a divisional of application Ser. No. 08/994,380, filed Dec. 19, 1997, now U.S. Pat. No. 5,860,594.

BACKGROUND OF THE INVENTION

1. Field of the Invention

The present invention relates to transport refrigeration systems, and more particularly to a method for changing operational modes of transport refrigeration systems.

2. Description of Related Art

A particular difficulty of transporting perishable items is that such items must be maintained within a narrow temperature range to prevent, depending on the items, spoilage or conversely damage from freezing. In order to maintain proper temperatures within a transport cargo space temperature sensors are typically provided in a transport refrigeration unit that measure both the supply air and return air temperatures exiting and entering the unit, respectively. These sensors are usually housed directly within the refrigeration unit so that the sensors can be positioned during manufacture of the unit rather than having to be reinstalled each time a unit is moved to a new cargo container.

It has been recognized, however, that the temperature of the perishables within a cargo space does not necessarily correspond with either the temperature of the refrigeration unit's supply or return air. When such a unit is operated in an automatic start/stop mode for the purpose of conserving fuel by the unit's internal combustion engine, basing the unit's operational cycle on the supply air temperature may cause the unit to cease operation before the temperature within the perishable container is properly "pulled down" to a pre-determined setpoint temperature, thus leading to spoilage. Similarly, if the operational cycle is based upon the return air sensor then the perishables may "top-freeze" from too much supply air.

Transport refrigeration monitoring systems for use with perishable products are well known. Truckenbrod et al (U.S. Pat. No. 5,209,072) ("Truckenbrod") teaches a refrigeration control system having multiple sensors that varies the sensor being used to control the refrigeration unit based upon the interrelation of the sensors, and it is hereby incorporated by reference. The Truckenbrod system, however, is limited by both its complexity and inability to operate in a start/stop mode—that is, the engine used in association with Truckenbrod et al. is in continuous operation and therefore cannot enjoy the fuel savings of a start/stop operational mode. It would be desirable to have a transport refrigeration system that could run in a start/stop mode so as to enjoy fuel savings over running in a continuous operation mode while maintaining the integrity of perishable products within the transport container.

SUMMARY OF THE INVENTION

One object of the present invention is to provide a transport refrigeration unit capable of maintaining the integrity of perishables within a cargo space using temperature sensors housed on or within the refrigeration unit.

Another object of the present invention is to provide a transport refrigeration unit capable of maintaining the integrity of perishables within a cargo space that can still operate in an automatic start/stop mode so as to enjoy increased fuel savings over simply operating in a continuous mode.

According to the present invention, a method and apparatus for changing operational modes of a transport refrigeration unit is provided, where the unit is capable of operating in a continuous heating/cooling mode or an automatic start/stop heating/cooling mode. A supply air temperature sensor measures the temperature of the air exiting the unit, a return air temperature sensor measures the temperature of the air returning to the unit, and an ambient air temperature sensor measures the temperature of the ambient air outside the unit. A controller electrically connected to the sensors determines if the ambient air temperature is above or below a pre-determined setpoint temperature, determines if the temperature differential across the return and supply air sensors is above or below a pre-determined upper threshold or a pre-determined lower threshold, and then changes the operational mode of the unit based upon such determinations and the prior operational mode of the unit.

These and other objects, features, and advantages of the present invention will become more apparent in light of the following detailed description of a best mode embodiment thereof, as illustrated in the accompanying drawings.

DESCRIPTION OF THE PREFERRED EMBODIMENTS

Figure 1:
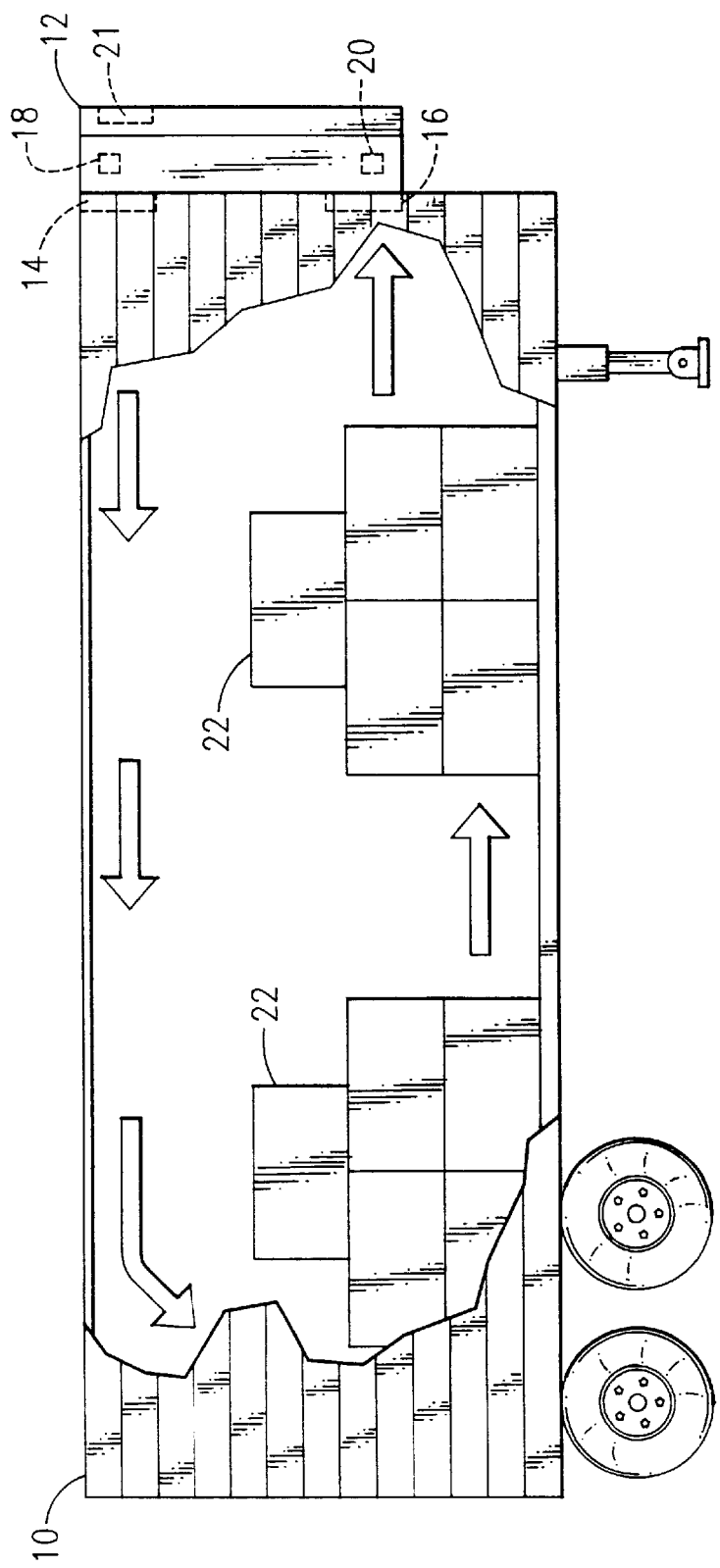
FIG. 1 is a side view of a trailer having a transport refrigeration unit mounted thereon with a portion of the trailer cut away to show air circulation throughout the trailer.

Referring now to the drawings wherein like numerals designate corresponding parts throughout the various views, FIG. 1 is a side view of a trailer 10 having a transport refrigeration unit 12 mounted thereon with a portion of the trailer cut away to show air circulation throughout the trailer. The refrigeration unit 12 has a supply air discharge vent 14, a return air intake vent 16, a supply temperature sensor 18 and a return temperature sensor 20. Conditioned air is discharged from the refrigeration unit 12 through vent 14 into the trailer 10 and circulates around perishables 22 as shown by the flow arrows. As the air is discharged from the refrigeration unit 12, it passes across the supply sensor 18, which measures the supply air temperature and supplies this value to a controller, which will be described further in conjunction with FIG. 4.

The supply air eventually falls to the bottom of the trailer and makes its way amongst the perishables 22 back to the intake vent 16. As the return air is drawn into the refrigeration unit 12, it passes across the return sensor 20, which similarly measures the temperature of the return air and supplies this value to the aforementioned controller.

Figure 2:
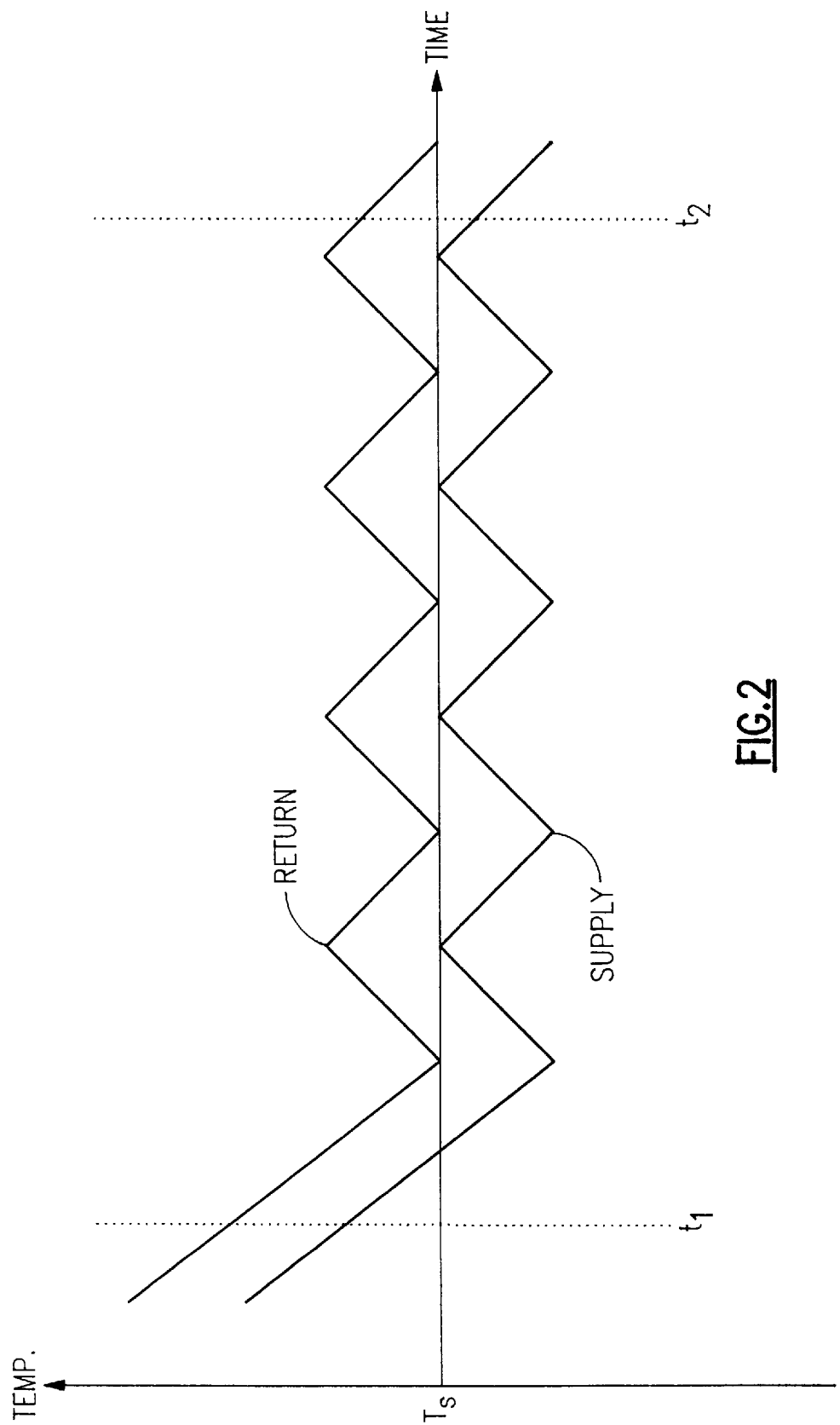
FIG. 2 is a graphical representation of a typical start/stop operational mode of a transport refrigeration unit where a return air sensor is used to control temperature cycles.

FIG. 2 is a graphical representation of a typical start/stop operational mode of a transport refrigeration unit where a return air sensor is used to control temperature cycles. FIG. 2 illustrates the temperatures of supply and return air during a "pull down" when the ambient temperature is higher than the setpoint temperature ($T_S$) selected for the particular perishable cargo. A pull down is when the transport environment, such as a trailer, is brought down to a pre-determined setpoint temperature and is usually required upon loading of perishables into such environment. Temperature is shown on the Y axis while time is shown on the X axis, and the difference between the return and supply curves represents the differential, or $\Delta T$, between the two values.

When an auto stop/start mode is used to pull down the perishable environment, the temperature of the supply air continues to fall until the return air reaches $T_S$. The unit would then automatically discontinue operation until such time that the return air sensor measured a temperature at or above a pre-determined level, at which point the unit would resume operation and supply cooled air until the return sensor returns a value of $T_S$. This cycle would then continue in a similar fashion throughout the duration of the perishable transportation. In this manner, the unit conserves fuel by avoiding continuous operation of its internal combustion engine. Yet, by comparison of $\Delta T$ at the times $t_1$ and $t_2$, it can be seen that $\Delta T$ remains essentially constant over time. It is desirable to have $\Delta T$ become as small as possible after a pull down so that the perishable environment remains within a narrow range, thus preventing either spoilage or freezing damage to the perishables.

Figure 3:
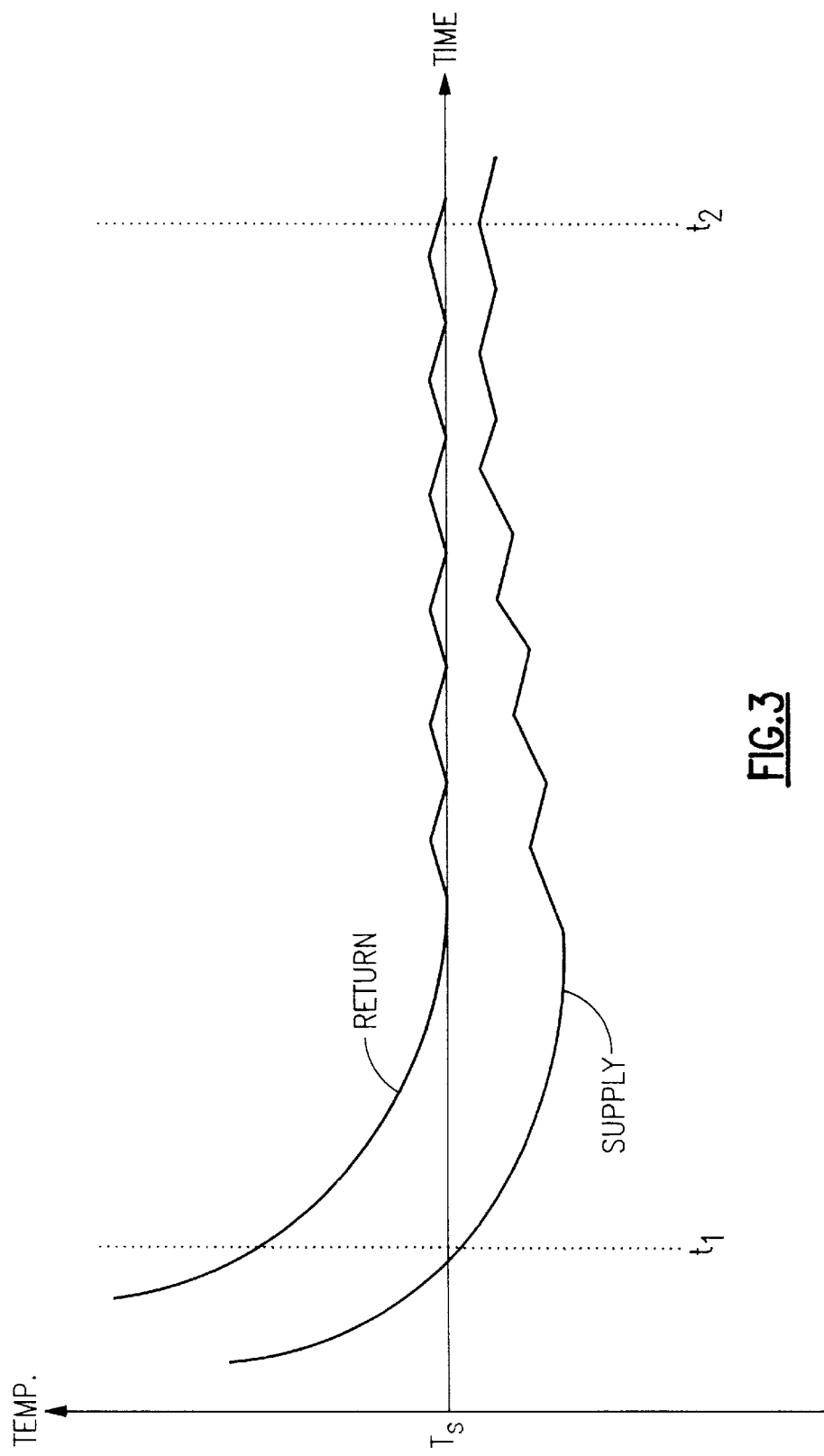
FIG. 3 is a graphical representation of a typical continuous operational mode of a transport refrigeration unit where a return air sensor is used to control temperature cycles.

FIG. 3 is a graphical representation of a typical continuous operational mode of a transport refrigeration unit where a return air sensor is used to control temperature cycles. FIG. 3 depicts the same situation as described in conjunction with FIG. 2 except that the refrigeration unit has been set to operate in continuous mode rather than an automatic start/stop mode. As was the case with the automatic stop/start operation mode of FIG. 2, a large $\Delta T$ exists at a time $t_1$ when pull down of the cargo space first begins.

The continuous mode differs from the automatic stop/start mode in that the unit begins to fluctuate between supplying heated air and cooled air to the cargo space when the return sensor detects $T_S$. In this manner, $\Delta T$ can be brought within a narrow range, as shown at $t_2$, so as to avoid spoilage and top-freezing of the perishables. Nonetheless, the internal combustion engine of the refrigeration unit must continue to operate and consume fuel throughout the entire transportation duration to maintain such a continuous mode.

Figure 4:
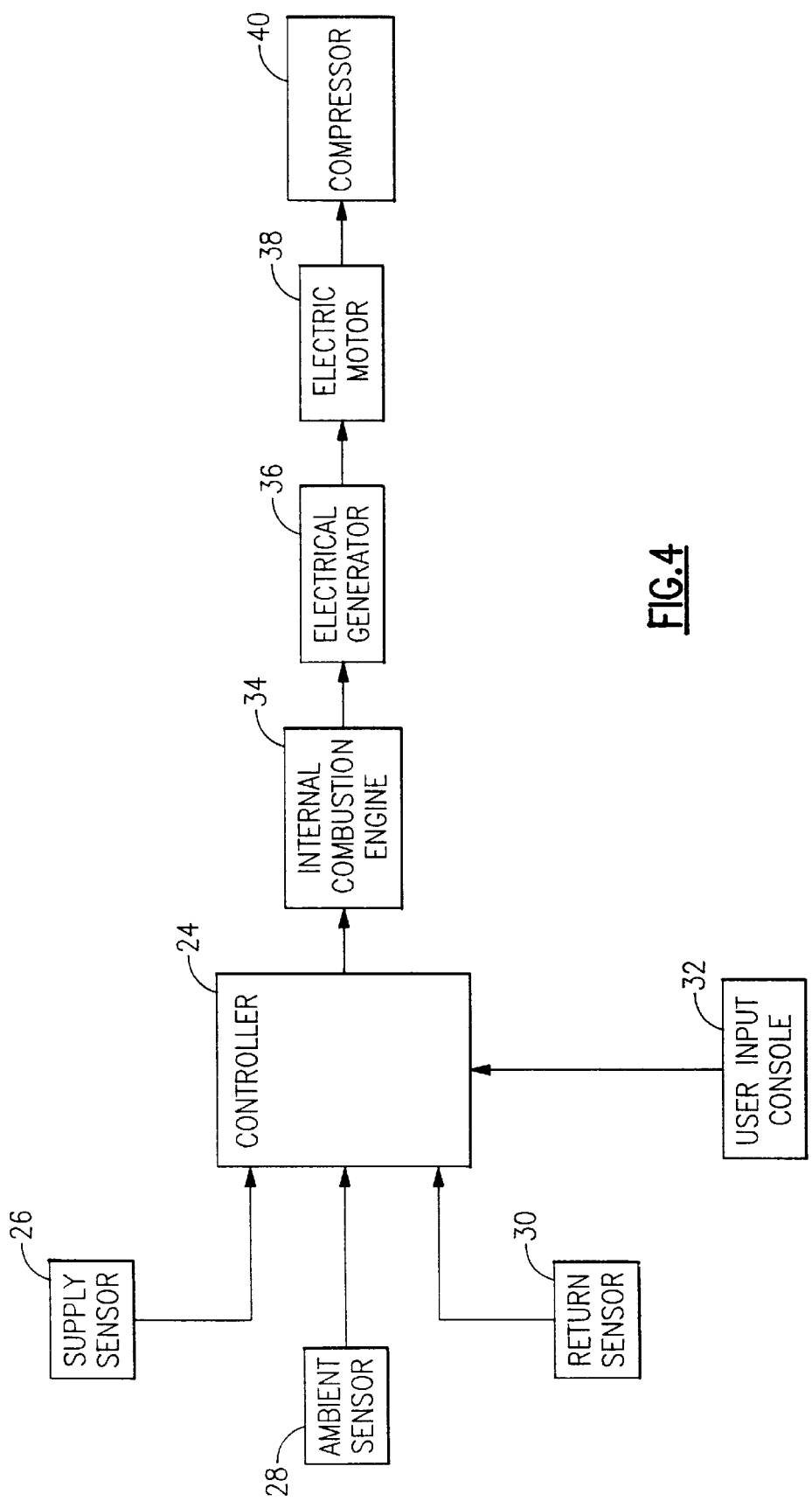
FIG. 4 is a functional schematic diagram of the present invention.
Figure 5:
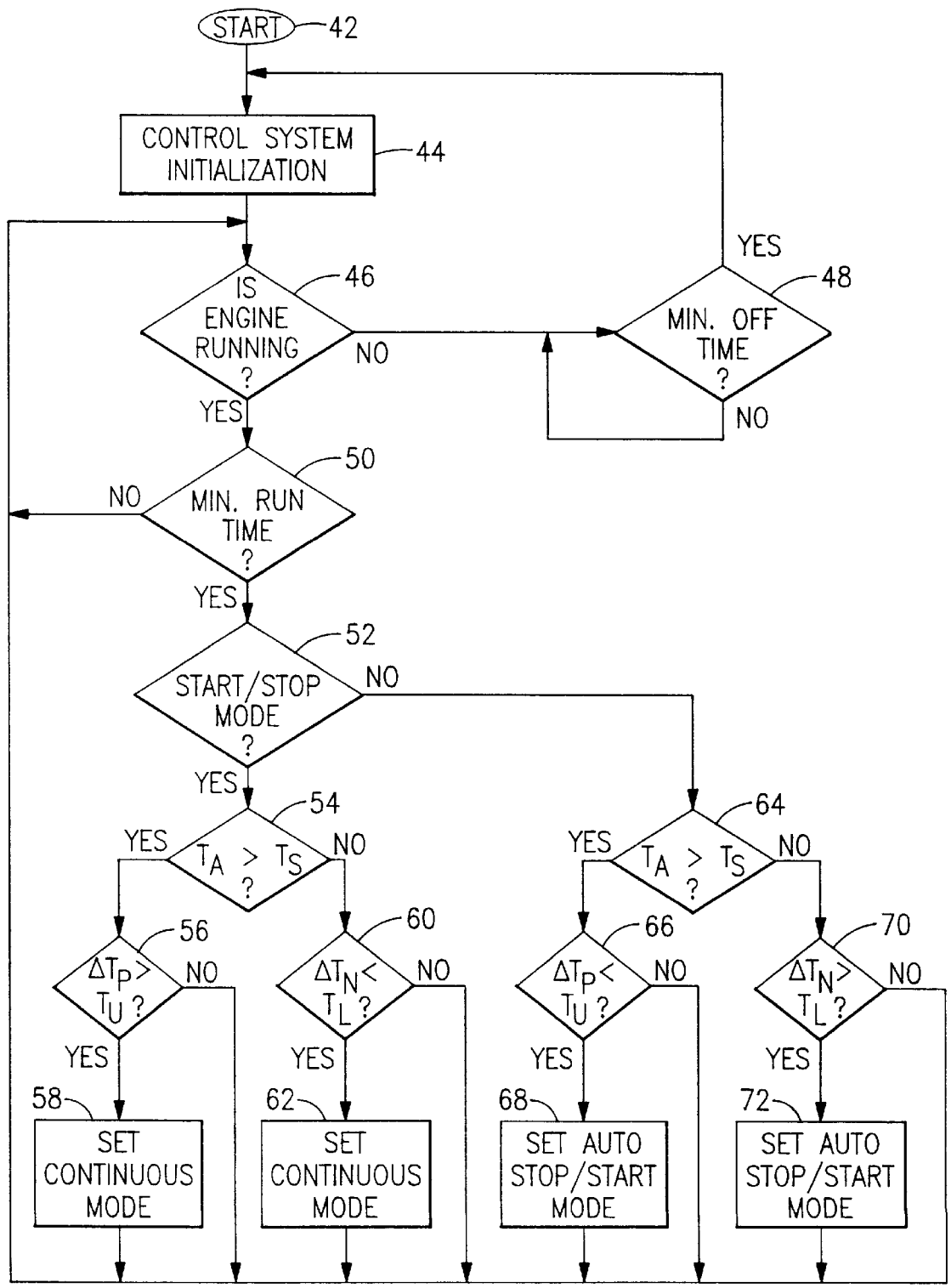
FIG. 5 is a flow diagram of the present invention.

The present invention combines the fuel savings of the automatic start/stop operational mode with the small $\Delta T$ achieved in a continuous operational mode by providing the ability to automatically and selectively switch between the two modes. The continuous operational mode is used during an initial pull-down to insure that $\Delta T$ is quickly brought within a narrow range. Then, the automatic stop/start mode may be initiated to conserve fuel, and the unit remains in such mode until the value of $\Delta T$ begins to increase beyond pre-determined upper or lower temperature thresholds above and below the setpoint value, respectively. Continuous operation mode will then be engaged until such time as $\Delta T$ is brought back within the narrow range between the upper and lower temperature thresholds, when the automatic start/stop mode may resume. The duration over which the automatic start/stop mode will operate will increase as the ambient temperature gets closer to setpoint, and vice-versa. FIGS. 4 and 5 illustrate how this switching is accomplished.

FIG. 4 is a functional schematic diagram of the present invention. A controller 24 receives temperature inputs from a supply sensor 26, an ambient sensor 28, and a return sensor 30, as described in conjunction with the sensors 14, 21, and 20, respectively, of FIG. 1.

The controller 24 also receives input from a user input console 32, which allows the user to input a desired setpoint temperature for a given load of perishables. The user input console 32 may also allow a user to input whether the unit should be operated in a continuous mode at all times, which may be desirable in extreme ambient temperatures, or whether the unit should alternate between continuous and automatic start/stop modes. If the user selects the alternating modes option, then the user will also be permitted to input the aforementioned upper and lower threshold temperatures, which will probably be a few degrees (or less) above and below the setpoint temperature.

Upon receiving an alternating modes command from the user input console 32, the controller 24 will cause the internal combustion engine 34 of the refrigeration unit to run continuously until $\Delta T$ is brought within the upper and lower threshold temperatures. In addition to engine 34 the refrigeration unit includes an electrical generator 36 driven by the engine, which in turn supplies power to an electric motor 38 which drives a refrigerant compressor 40. Other components of the refrigeration unit are not shown as they are well known in the art. Once $\Delta T$ is brought within the upper and lower threshold temperatures the controller 24 switches to an automatic start/stop mode and turns the engine 34 on and off accordingly.

FIG. 5 is a flow diagram of the present invention. The selection process between the continuous and automatic start/stop operational modes begins at 42 when the user initiates operation of the refrigeration unit 12 which causes a control system initialization, which includes engine start-up, as shown at 44. After initialization, the controller 24 determines if the engine 34 is running or not, as shown at 46. Such determination may be accomplished through the use of a magnetic pickup or other suitable means. If the engine is not running, the controller 24 then determines if a pre-determined minimum off time has elapsed before starting the control system initialization again, which is shown at 48. The minimum off time is provided in order to ensure that the engine has stopped moving before attempting to crank it again and also to allow the engine time to recover from engine shutdowns, due to events such as overheating and the like.

If in step 46 it is determined that the engine 34 is running, the controller 24 then determines if a pre-determined minimum run time has occurred, as shown at 50. The reason for incorporating a minimum run time is to cause continuous mode operation following engine start. This is desirable because normally when the engine 34 is off the cargo space temperature will have either fallen or risen in accordance with the ambient temperature, so extended heating or cooling will be required to minimize the value of $\Delta T$. If the minimum run time has not transpired, then the controller reverts to step 46 until such occurrence has elapsed.

When the minimum run time has elapsed, the controller next determines what the last operational mode was, as shown at 52. If the prior operational mode was automatic stop/start, the controller then next determines if the ambient temperature ($T_A$) is greater than the pre-determined setpoint temperature ($T_S$), as shown at 54. If it is then $\Delta T$, which equals the return air temperature minus the supply air temperature, will be positive ($\Delta T_P$), because the return air will always be hotter than the supply air under such ambient conditions. Likewise, if $T_A$ is lower than $T_S$, it indicates that the return air will be cooler than the supply air, and $\Delta T$ will be negative ($\Delta T_N$).

When $T_A$ is greater than $T_S$, the controller 24 determines if $\Delta T_P$ is greater than the upper threshold temperature ($T_U$), as shown at 56. The controller 24 is programmed to compare the value of $\Delta T$ with $T_U$ because of the high value of $T_A$ relative to $T_S$. If $\Delta T_P$ is greater than $T_U$, then the controller will change the operational mode from automatic stop/start to continuous, as shown at 58, since the value of $\Delta T_P$ exceeds the upper threshold. Otherwise, the controller 24 will maintain a stop/start mode and return to step 46.

If it is determined in step 54 that $T_A$ is not greater than $T_S$, then the controller 24 determines if $\Delta T_N$ is less than the lower threshold temperature $(T_L)$, as shown at 60. The controller 24 knows to compare the value of $\Delta T$ with $T_L$ because of the low value of $T_A$ relative to $T_S$. If $\Delta T_N$ is less than $T_L$, then the controller will change the operational mode from automatic stop/start to continuous, as shown at 62, since the value of $\Delta T_N$ exceeds the upper threshold. Otherwise, the controller 24 will maintain a stop/start mode and return to step 46.

If it is determined at step 52 that the prior operational mode was continuous, then the controller next determines if $T_A$ is greater than $T_S$, as shown at 64. Again, this means that $\Delta T$ will be positive $(\Delta T_P)$, and the controller will then check to see if $\Delta T_P$ is less than $T_U$, as shown at 66. If this condition exists, the controller will correspondingly switch to automatic start/stop mode, as shown at 68, since $\Delta T$ is within an acceptable range about $T_S$. Otherwise, the controller 24 will maintain a continuous mode and return to step 46.

Finally, if it is determined at step 64 that $T_A$ is not greater than $T_S$, then $\Delta T$ will be negative $(\Delta T_N)$ and the controller 24 will check to see if $\Delta T_N$ is less than $T_L$, as shown at 70. If it is, the controller 24 will correspondingly switch to automatic start/stop mode, as shown at 72, since $\Delta T$ is within an acceptable range about $T_S$. Otherwise, the controller 24 will maintain a continuous mode and return to step 46.

Though the above description primarily describes operation in a pull down situation, i.e. when the ambient temperature is higher than the setpoint temperature, the unit will operate in a like manner when the ambient temperature is lower than the setpoint. In such case the controller 24 will cause the unit to heat the cargo space rather than cool it, but the operational steps of the present invention are the same as just described. Furthermore, it should be appreciated that the present invention is equally applicable to all transport refrigeration units, such as container refrigeration units, reefer units mounted on tractor trailers, and the like, and is not limited solely to tractor trailer refrigeration units. Furthermore, though a primary focus of the invention is to allow fuel savings, the present invention may be used in conjunction with a transport refrigeration unit having an electric motor rather than an internal combustion engine, and would result in power savings instead of fuel savings.

Although the invention has been shown and described with respect to a best mode embodiment thereof, it should be understood by those skilled in the art that various changes, omissions, and additions may be made to the form and detail of the disclosed embodiment without departing from the spirit and scope of the invention as recited in the following claims.

What is claimed is:

1. A method for changing operational modes of a transport refrigeration unit, the unit having sensors for monitoring supply, return, and ambient air temperatures, and the unit being capable of operating in a continuous heating/cooling mode or an automatic start/stop heating/cooling mode, comprising the steps of:

a) determining if said unit has been running for a predetermined period of time;

b) determining if said unit is operating in said continuous mode or said start/stop mode;

c) comparing the output of said ambient sensor with a pre-determined setpoint temperature to determine if said ambient air temperature is at or above or below said setpoint temperature;

d) measuring the temperature differential across said return and supply air sensors to determine if said differential is at or above or below a pre-determined upper threshold or a pre-determined lower threshold; and e) changing the operational mode of said unit based upon the results obtained in steps b) through d).

2. The method of claim 1, wherein the operation of said unit is changed to said continuous mode following a determination that said unit is operating in said stop/start mode, a determination that said ambient air temperature is at or above said setpoint temperature, and a determination that said differential is at or above said upper threshold.

3. The method of claim 1, wherein the operation of said unit is changed to said continuous mode following a determination that said unit is operating in said stop/start mode, a determination that said ambient air temperature is below said setpoint temperature, and a determination that said differential is below said lower threshold.

4. The method of claim 1, wherein the operation of said unit is changed to said start/stop mode following a determination that said unit is operating in said continuous mode, a determination that said ambient air temperature is at or above said setpoint temperature, and a determination that said differential is below said upper threshold.

5. The method of claim 1, wherein the operation of said unit is changed to said start/stop mode following a determination that said unit is operating in said continuous mode, a determination that said ambient air temperature is below said setpoint temperature, and a determination that said differential is at or above said lower threshold.

* * * * *